United States Patent [19]
Lainé et al.

[11] Patent Number: 4,766,857
[45] Date of Patent: Aug. 30, 1988

[54] BALANCING DEVICE FOR A RECIPROCATING PISTON ENGINE

[75] Inventors: Gabriel Lainé, Andrésy; Henri Zawadzki, Vitry sur Seine, both of France

[73] Assignees: Automobiles Peugeot, Paris; Automobiles Citroen, Neuilly sur Seine, both of France

[21] Appl. No.: 94,454

[22] Filed: Sep. 9, 1987

[30] Foreign Application Priority Data

Sep. 9, 1986 [FR] France ............... 86 12623

[51] Int. Cl.$^4$ .................. F01M 1/00; F02B 75/06
[52] U.S. Cl. .................. 123/192 B; 123/196 R; 184/6.5
[58] Field of Search .......... 123/196 R, 192 B

[56] References Cited

U.S. PATENT DOCUMENTS 4,300,493 11/1981 Berti .................. 123/192 B
4,690,111 9/1987 Kohno et al. ........... 123/192 B

FOREIGN PATENT DOCUMENTS 1196012 3/1966 Fed. Rep. of Germany .
3142669 11/1982 Fed. Rep. of Germany .

*Primary Examiner*—E. Rollins Cross
*Attorney, Agent, or Firm*—Burns, Doane, Swecker & Mathis

[57] ABSTRACT

The invention relates to the arrangement of a balancing device in a casing, for a reciprocating piston engine, which permits the evacuation of the lubricating oil. The device comprises two balancing shafts (7, 8) disposed in a main part (19) of the casing (11) and each fastened to one or two intermeshing pinions (21, 22) situated in an auxiliary part of the casing. A bottom oil passage (25a) provided between the two parts of the casing enables the pinions, acting as a draining pump, to fully drain the casing.

6 Claims, 2 Drawing Sheets

BALANCING DEVICE FOR A RECIPROCATING PISTON ENGINE

The present invention relates to a balancing device for an internal combustion engine having reciprocating pistons associated with a crankshaft.

Engines of this kind may incorporate balancing devices comprising two balancing shafts parallel to and rotationally driven by the crankshaft, one of them turning in the same direction as the latter and the other in the opposite direction.

The two balancing shafts, each provided with an eccentric balancing weight, are advantageously disposed near one another in a casing fixed under the crankshaft and situated in the usual engine sump. Each of them is fastened to one of the two intermeshing pinions which reverse the direction of rotation of one of the shafts relative to the other. The casing enclosing the two shafts prevents the balancing weights from turning, at least partly, in the oil contained in the sump under the crankshaft, which would give rise to considerable expenditure of energy. However, the oil for lubricating the bearings of the two shafts enters the casing and slowly accumulates therein until it reaches at least one of the balancing weights, which splashes the oil out of the casing through an appropriate opening. This splashing still entails a slight expenditure of energy, and above all emulsifies the oil, which may be particularly harmful to the lubrication of the engine bearings and to the operation of the hydraulic tappets sometimes used in the engine valve control system.

The present invention consequently seeks to provide a balancing device equipped with shafts having balancing weights which do not spash in the oil.

The invention thus proposes an arrangement of a balancing device comprising two shafts provided with balancing weights and disposed in a casing and each fastened to one of two intermeshing pinions, characterized in that the casing is divided by a partition into two chambers, namely a main chamber and an auxiliary chamber, the balancing weights of the two shafts being housed in the main closed chamber of the casing, which is connected by a bottom passage to the auxiliary chamber containing the two pinions and arranged as a drain gear pump.

The invention will now be described in greater detail with reference to the accompanying drawings, which are given solely by way of example and in which.

Figure 1:
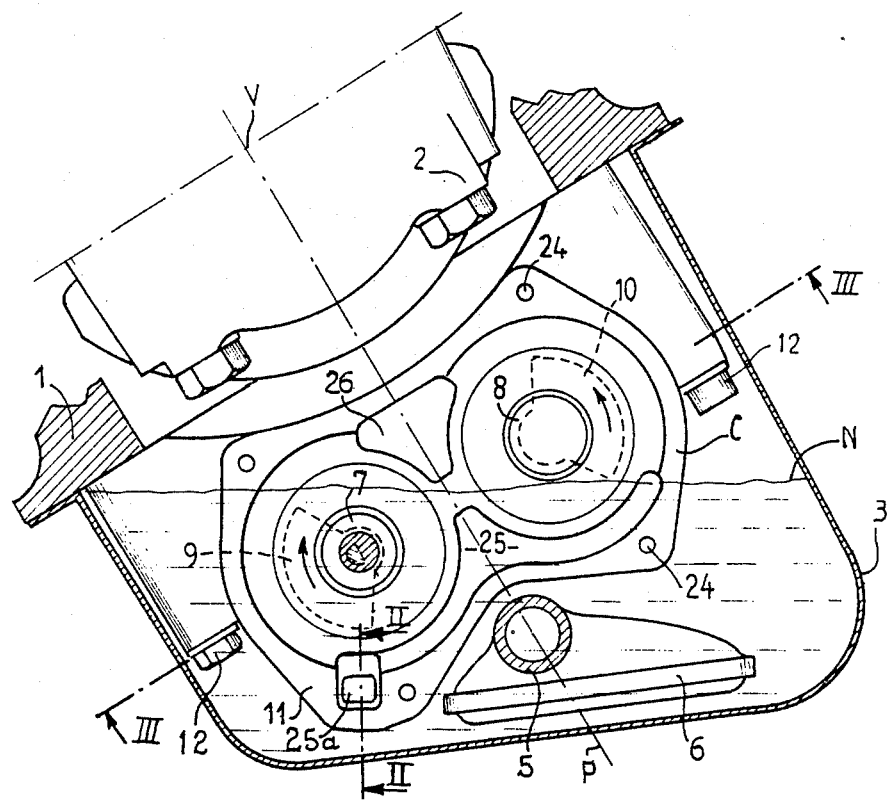
FIG. 1 is a view in cross-section (through a plane at right angles to the axis of the crankshaft, as indicated by the line I—I in FIG. 3) of the bottom of an engine, the pinions and the cover of the draining pump having been removed.

Under a cylinder block 1 containing the crankshaft (whose axis is designated V) of an engine and its bearings 2 is fixed a sump 3 containing oil (mean level: N) and an oil pump 4 (FIG. 3) whose suction duct 5 is connected to a strainer 6 disposed at the bottom of the sump.

Two balancing shafts 7, 8 parallel to the axis V of the crankshaft, and each provided with a balancing weight 9, 10, are carried by a casing 11 situated in the sump 3 and fixed to the cylinder block by screws 12. The shafts turn in bearings 13 lubricated by oil supplied under pressure through ducts 14, 15 provided in the casing 11 and in each shaft 7, 8.

The shaft 7 is driven rotationally by the crankshaft, via a driving shaft 16 coupled to one of its ends, by means of a chain 17 which also drives the shaft 18 of the pump 4.

Figure 3:
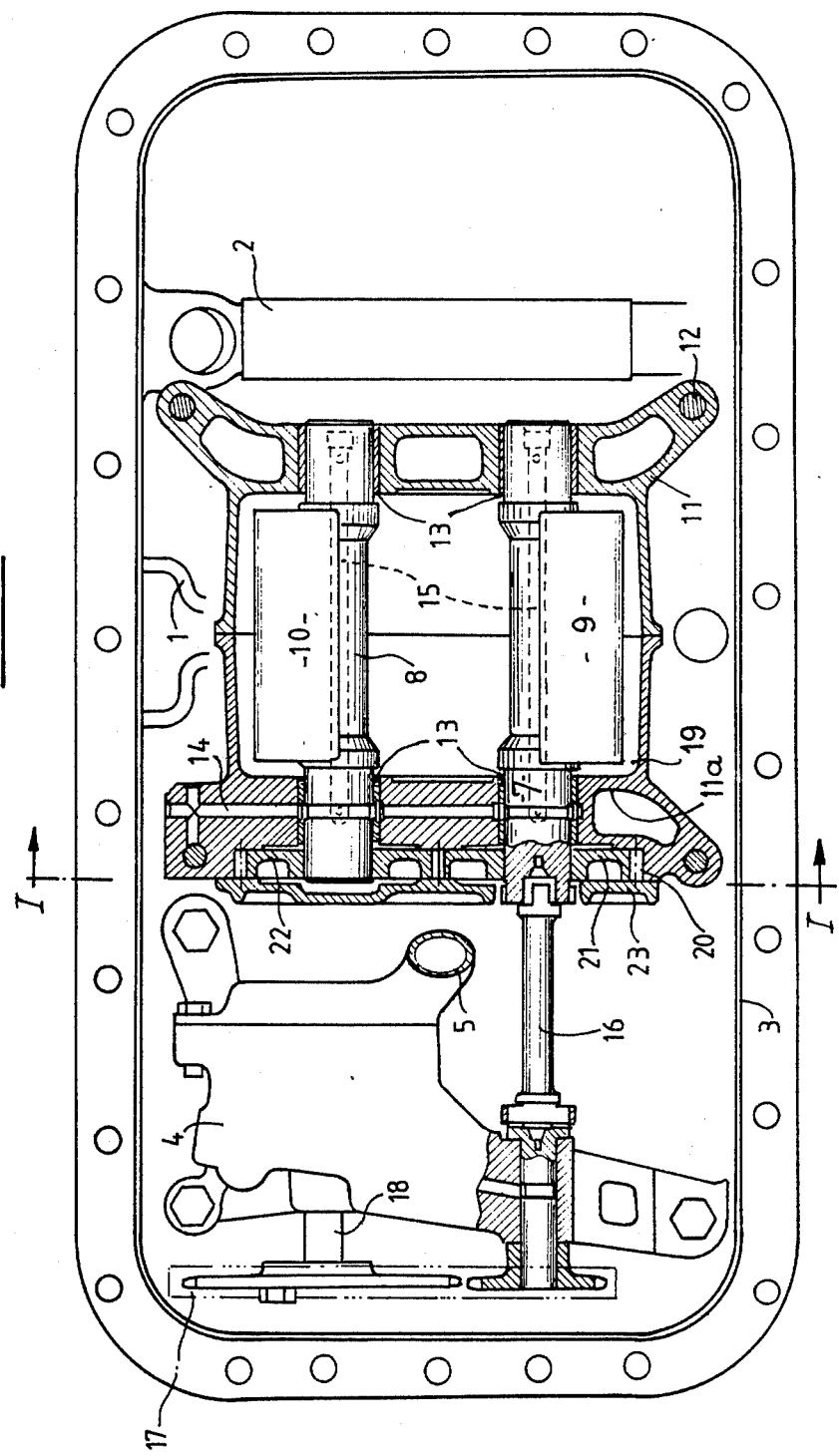
FIG. 3 is a view from below in section on the line III—III in FIG. 1.

The casing is provided with a partition 11a which extends at right angles with respect to the axes of the shafts 7, 8, and which divides said casing into two chambers, namely a main, closed chamber 19 containing the balancing weights 9, 10, and an auxiliary chamber 20 containing two pinions 21, 22 and closed by a cover 23 fixed to the casing by screws (not shown) engaged in tapped holes 24 in the casing (FIG. 3). In FIG. 1 the cover 23 and the pinions 21, 22 have been removed and are not represented.

Figure 2:
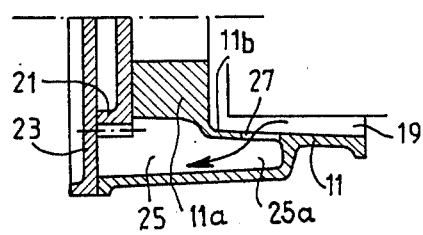
FIG. 2 is a view, in section on the line II—II in FIG. 1, of a part of the device.

The pinions 21, 22 are each fastened to one of the balancing shafts 7, 8 and intermesh to rotate the shaft 8 in the opposite direction to the one of the shaft 7. In addition, the auxiliary chamber 20 of the casing is arranged as a draining gear pump. For this purpose it is provided (FIGS. 1 and 2) with a bottom suction zone 25 and a top delivery zone 26, the oil being circulated in the appropriate direction by means of the rotation of the pinions 21, 22 in the directions indicated by arrows in FIG. 1.

The suction zone 25 also extends through a bottom cavity 25a under the main chamber 19 of the casing, from which it is separated by an extension 11b of the partition 11a and with which it is in communication through a bottom opening 27 (FIG. 2) provided in said partition. The oil arriving in the main chamber 19 via bearings 13 passes into the zone 25 through this opening 27 and via the cavity 25a. The main chamber 19 is therefore drained, thus permitting free rotation of the balancing weights 9, 10 without risk of splashing in the oil.

The plane of symmetry P of the pump is here slanted and encounters the axis V, while the bottom passage 27 is positioned at the lowest point in the casing in order to ensure an optimum draining of the latter.

The delivery zone is connected in a manner not illustrated to the sump serving as an oil reserve for feeding the pump 4.

As an alternative, particularly in the case of an engine having a dry sump and an auxiliary tank serving as an oil reserve for feeding the lubricating pump, the delivery zone 26 is connected to said auxiliary tank and the suction zone 25 is connected to a low part of the sump for draining purposes, and optionally also to other components of the engine the draining of which is desirable.

We claim:

1. A balancing device for a reciprocating piston internal combustion engine, comprising two balancing shafts disposed in a casing, each provided with a balancing weight and each fastened to one of two intermeshing pinions, characterized in that the casing is divided by a partition into two parts, namely a main part and an auxiliary part, the balancing weights of the shafts being housed in the closed main part of the casing, which is connected by a bottom passage to the auxiliary part containing the two pinions and arranged as a draining gear pump, and in that the auxiliary part comprises a bottom suction zone, into which the bottom passage leads, and a top delivery zone connected to an oil reserve.

2. A balancing device according to claim 1, characterized in that the bottom passage is positioned at the lowest point of the casing.

3. A balancing device according to claim 1, characterized in that the oil reserve is in the form of a sump serving as reservoir for an engine lubricating pump.

4. A balancing device according to claim 1, characterized in that the oil reserve is in the form of a separate auxiliary tank feeding a lubricating pump.

5. A balancing device according to claim 4, characterized in that the bottom suction zone is connected to a low part of an engine sump.

6. A balancing device according to one of claims 1 to 4, characterized in that the suction zone is also connected to at least one other component of the engine.

* * * * *